UNITED STATES PATENT OFFICE.

GEORGE A. BURRELL, OF NEW YORK, N. Y., AND CLYDE L. VORESS AND VERNON C. CANTER, OF BRADFORD, PENNSYLVANIA, ASSIGNORS TO GASOLINE RECOVERY CORPORATION, A CORPORATION OF DELAWARE.

METHOD OF DISSIPATING HEAT IN PROCESS FOR EXTRACTING VAPORS FROM GASEOUS MIXTURES.

1,382,889.      Specification of Letters Patent.     Patented June 28, 1921.

No Drawing.     Application filed January 24, 1921. Serial No. 439,676.

*To all whom it may concern:*

Be it known that we, GEORGE A. BURRELL, CLYDE L. VORESS, and VERNON C. CANTER, citizens of the United States, whose residences are, respectively, New York, county of New York, and State of New York, Bradford, county of McKean, and State of Pennsylvania, and Bradford, county of McKean, State of Pennsylvania, have invented certain new and useful Improvements in Methods of Dissipating Heat in Process for Extracting Vapors from Gaseous Mixtures; and we do hereby declare the following to be a full, clear, and exact description of the invention, such as will enable others skilled in the art to which it appertains to make and use the same.

This invention relates to an improved method of extracting vapors of gasolene, naphtha, kerosene, benzol, toluol, alcohol, chloroform, carbon, tetrachlorid, ammonia and formaldehyde, or any other substance of commercial value amenable to recovery by this process from gaseous or vapor mixtures.

The separation and recovery of gasolene and other hydrocarbon vapors from gaseous mixtures by an absorbing method involving the use of solid absorbent mediums, such as activated charcoal, silica gel, etc., and the subsequent extraction of said vapors from the absorbent, is already known.

It is also known that the vapors may be extracted from the absorbent by introducing superheated steam directly into the absorbent containing the recovered vapors. While the use of superheated steam is advantageous for distilling the vapors from the absorbent, it has been found in practice that this leaves the absorbent considerably warmer than is consistent with efficient absorption. It has also been found that when a gaseous vapor is absorbed by a solid absorbent considerable heat is evolved.

Prior to the present invention, an apparatus has been used comprising three absorbers arranged in series in such a manner that one is always being cooled by the gas that has been treated in a previous passage. In using this apparatus, it has been observed that in certain gas mixtures where there is a greater amount of gaseous vapors amenable to recovery, the denuded gas is not sufficient to disperse the heat and cool the absorbent to normal.

The present process contemplates introducing a quantity of either a single gas or a mixture of gases into the gaseous mixture containing the vapors to be recovered for the purpose of increasing its capacity for removing heat from the absorbent in the absorbers. The gas introduced may be any gas containing a smaller proportion of vapors condensable under the operating conditions than the original gas being treated for the removal of valuable vapors.

In order to carry out our improved process to dissipate the heat in a vapor recovery system, we preferably cause some of the gas which has already been passed through the absorbent and cooled by any means now in common practice, or other gas containing a relatively small amount of or no vapors recoverable under the existing conditions to be introduced into the vapor mixture by means of pumps, blowers, or other mechanical means before passing through the system. The advantage of this is found in the increased volume of gas which is available for carrying off the quantity of heat desired. It is not possible to pass a greater amount of the original gas mixture through the absorber for cooling purposes without losing an appreciable quantity of valuable vapor, which may be saved by our method.

It will be understood from the foregoing that we propose to first dilute a gas mixture containing a relatively large amount of recoverable vapors with a gas mixture containing a smaller amount of vapors or no vapors at all, then pass the combined mixture through an absorption system to extract the vapors from the gas, and subsequently distil the absorbed vapors from the absorbent.

While the preferred method of dissipating the heat is described above, it is obvious modifications and changes may be made in the method without departing from the spirit of the invention as expressed in the claims.

What we claim and desire to secure by Letters Patent is:—

1. A method of dissipating heat in a vapor recovery process consisting in diluting gas mixtures containing larger percentages of recoverable vapors with a gas containing smaller percentages of recoverable vapors.

2. A method of dissipating heat in an absorption process for recovering vapors consisting in diluting gas mixtures containing larger percentages of recoverable vapors with a gas containing smaller percentages of recoverable vapors.

3. A method of dissipating heat in a vapor recovery process consisting in diluting gas mixtures containing the vapors to be recovered with a gaseous mixture which has been substantially denuded of its vapors.

4. A process for recovering vapors from gaseous mixtures containing the same consisting in diluting a gas mixture containing the recoverable vapors with a gas containing a smaller percentage of recoverable vapor, contacting the gases and vapors with a solid absorbent, and extracting the vapors from the absorbent.

5. A process for recovering vapors from gaseous mixtures containing the same consisting in contacting said gaseous mixture with a solid absorbent which absorbs the vapors from the mixture, diluting the mixture with a gaseous mixture which has previously been denuded of its vapors by the absorbent, and cooling the diluting mixture before it is mixed with the first mentioned mixture.

6. A method of dissipating heat in a vapor recovery process consisting in diluting gas mixtures containing larger percentages of recoverable vapors with a gas which has been previously denuded of a portion of its vapors by being passed through a vapor recovery system.

7. A process for recovering vapors from gaseous mixtures containing the same, consisting in contacting said mixture with an absorbent which absorbs the vapors from the mixture, diluting the mixture before contacting the same with the absorbent with a gaseous mixture which has previously been denuded of at least a portion of its vapors by the absorbent, and extracting the vapors from the absorbent.

In testimony whereof we affix our signatures.

GEORGE A. BURRELL.
CLYDE L. VORESS.
VERNON C. CANTER.